(12) United States Patent
Keller et al.

(10) Patent No.: US 8,229,408 B2
(45) Date of Patent: Jul. 24, 2012

(54) SYSTEM AND METHOD FOR SELECTING A SUBSYSTEM FOR CALL TERMINATION

(75) Inventors: Ralf Keller, Würselen (DE); Andreas Witzel, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1099 days.

(21) Appl. No.: 12/091,000

(22) PCT Filed: Oct. 21, 2005

(86) PCT No.: PCT/EP2005/011354
§ 371 (c)(1),
(2), (4) Date: Apr. 21, 2008

(87) PCT Pub. No.: WO2007/045266
PCT Pub. Date: Apr. 26, 2007

(65) Prior Publication Data
US 2008/0268818 A1    Oct. 30, 2008

(51) Int. Cl.
*H04M 3/42* (2006.01)
(52) U.S. Cl. .......... 455/417; 455/414.1; 455/435.2; 455/445; 455/552.1; 455/553.1; 370/338; 370/352; 370/353
(58) Field of Classification Search ........... 455/414.1, 455/417, 435.2, 445, 552.1, 553.1, 556.1, 455/560; 370/352, 353, 360, 338
See application file for complete search history.

(56) References Cited

U.S. PATENT DOCUMENTS

| | | | |
|---|---|---|---|
| 6,298,232 B1 * | 10/2001 | Marin et al. | 455/413 |
| 7,133,516 B2 * | 11/2006 | Belkin et al. | 379/211.02 |
| 7,403,517 B2 * | 7/2008 | Westman | 370/352 |

* cited by examiner

Primary Examiner — Temica M Beamer

(57) ABSTRACT

A subsystem selection entity and method of controlling a subsystem selection entity is described. The subsystem selection entity is arranged to conduct a subsystem selection-procedure and a control procedure which comprises at least one control operation for controlling how one or more subsystems conduct a subscriber-not-reachable service.

28 Claims, 9 Drawing Sheets

SYSTEM AND METHOD FOR SELECTING A SUBSYSTEM FOR CALL TERMINATION

FIELD OF THE INVENTION

The present invention relates to a subsystem selection entity for a communication system that comprises at least two subsystems, such as a circuit switched subsystem and an Internet protocol Multimedia System (IMS) subsystem, and to a corresponding method of controlling a subsystem selection entity.

BACKGROUND OF THE INVENTION

In the field of mobile communication, circuit switched networks have traditionally been used, as e.g. in the GSM system. GSM has been steadily updated, and also more recently developed mobile communication systems such as CDMA and WCDMA (in accordance with the third generation partnership project 3GPP) make use of circuit switching.

Also, communication systems have been developed and are in development that are based upon the Internet Protocol (IP), such as the so-called IP Multimedia System (IMS). IMS is also standardized under the third generation partnership project. IMS based networks are being used to provide a plurality of services to the user of a mobile terminal, such as simple messaging or presence services, but more increasingly also telephony services such as Voice-over-IP (VoIP). As an example, it is presently already possible to provide an IMS based telephony service using WLAN radio access technology.

In order to address specific problems of selecting a proper subsystem or domain, the inventors of the present invention have described a basic service routing decision entity and service routing decision method in the earlier patent application PCT/EP2005/004515, the contents of which are fully incorporated herein by reference.

In technical document S2-050995 of 3GPP TSG-SA WG2 meeting no. 46 in Athens, Greece, May 9-May 13, 2005, a proposal was made for introducing a so-called Network Domain Selection functionality (NeDS) as a means for selecting a desired subsystem in which to terminate a mobile terminating call directed towards a terminal that can be reached via an IMS subsystem and a CS subsystem. The described network domain selection entity is arranged for conducting a subsystem selection procedure that comprises making at least one subsystem selection decision associated with a subscriber terminating service involving the terminal, for selecting one of the described subsystems or domains for terminating the subscriber terminating service at the terminal.

FIG. 9 shows a logical representation of the network subsystem selection functionality explained in technical document S2-050995. Reference numeral 90 relates to a network domain selection entity, 91 to an IMS subsystem, 92 to a circuit switched subsystem and 93 to a mobile terminal that has the capability of communicating via the IMS subsystem 91 and the circuit switched subsystem 92. The basic operation of the selection entity 90 consists in for example receiving an IMS multimedia telephony terminating request 901 and then deciding to terminate the call via the IMS subsystem 91 (arrow 902) or via the circuit switched subsystem 92 (arrows 903, 904). Equally, the entity 90 could receive a telephony call to the circuit switched domain 911, and could decide to route this call through the circuit switched subsystem 92 (arrow 912), or via the IMS subsystem (arrows 913, 914).

OBJECT OF THE INVENTION

The object of the invention is to provide an improved subsystem selection entity and an improved method of controlling a subsystem selecting entity.

SUMMARY OF THE INVENTION

This object is solved by the subject-matter of the independent claims. Advantageous embodiments are described in the dependent claims.

In accordance with an embodiment of the present invention, the subsystem selection entity is not only arranged to conduct a subsystem selection procedure for selecting one of a plurality of possible subsystems, but is furthermore arranged to perform a control procedure that comprises at least one control operation for controlling how at least one of the plurality of subsystems conduct a subscriber-not-reachable service. A subscriber-not-reachable service is a service that is conducted by a subsystem in the event that the subscriber terminating service cannot be terminated by a selected subsystem.

Examples of a subscriber terminating service are a call or a message to be terminated at the desired terminal, as opposed to a subscriber originating service, and an example of a subscriber-not-reachable service is the forwarding of the call or message to a predetermined rerouting point, such as in CFNRc (call forward on mobile subscriber not reachable).

Handling of the subscriber terminating service and the efficiency of the overall system can be greatly improved by implementing in the subsystem selection entity a control procedure that comprises controlling how one or more of the plurality of selectable subsystems conduct a subscriber-not reachable service. Namely, in an entity that only performs a subsystem selection, the problem can occur that a subscriber terminating service, if it cannot be terminated at a particular subsystem, can lead to a high amount of signalling traffic. There are also problems relating to the question of the proper placement of the subsystem selection entity in the overall system. If the subsystem selection entity is placed in the home network of a user, then it has no knowledge about whether the user/subscriber is reachable via any particular subsystem, as this knowledge is only present in the network that the user/subscriber is visiting. If the subsystem selection entity is placed in the visited network, then information on the terminal's reachability is available, but the operator of the home network has little control of the visited network and a great number of nodes must be updated for implementation. Moreover, the interface between e.g. circuit switched and IMS home subsystems with the subsystem selection entity must occur over the roaming/transit interface. If the subsystem selection entity is placed between the home and visited networks, then it needs to be globally reachable, which requires global addressing, which in turn is difficult to administer and may cause security problems, because the interfacing between the networks is done over public networks.

By adding the functionality that the subsystem selection entity can control how a subsystem conducts a subscriber-not-reachable service, the placement of the subsystem selection entity becomes less problematic. This can be seen from the following example. If one assumes that the subsystem selection entity is placed in the home network, then the subscriber-not-reachable control procedure can e.g. consist in sending a command or indication to a selected subsystem in the visited network, where the command or indication may instruct the visited subsystem to not perform a predetermined subscriber-not-reachable service (or not any subscriber-not reachable at all) for a given subscriber terminating service (e.g. a voice or multimedia call) that is being handled. If the subscriber is not reachable, then the service to be terminated should be passed back to the subsystem selection entity, such that the subsystem selection entity could in that case reroute it to another subsystem over which the terminal in question might be reachable. In this way, the subsystem selection entity could perform a control operation that prioritises reaching the subscriber, instead of having a subscriber-not-reachable service conducted. One may note in this example that the subsystem selection entity does not have to know if the terminal is reachable in any of the subsystems, such that there is no problem in having the subsystem selection entity placed in the home network.

Naturally, this is only an example, and the subscriber-not-reachable control procedure performed by the subsystem selection entity could also e.g. consist in commanding a selected subsystem to conduct a specific subscriber-not-reachable service. In this way, the operator controlling the subsystem selection entity (e.g. the home operator of the terminal's subscriber) can remain in control over the specific subscriber-not-reachable service applied to a given terminal.

The control of the subsystem by the subsystem selection entity can be done in any suitable or desirable way, e.g. by the sending of direct command or by choosing one of a plurality of predetermined policies, where the subsystems being controlled are aware of said policies, and then only indicating the chosen policy to one or more of the subsystems.

BRIEF DESCRIPTION OF FIGURES

The concept of the present invention will become better understandable from the following detailed description of various embodiments, which serve to illustrate examples of the invention without being in any way limiting. The description will make reference to the figures, in which.

DETAILED DESCRIPTION OF EMBODIMENTS

Figure 1:
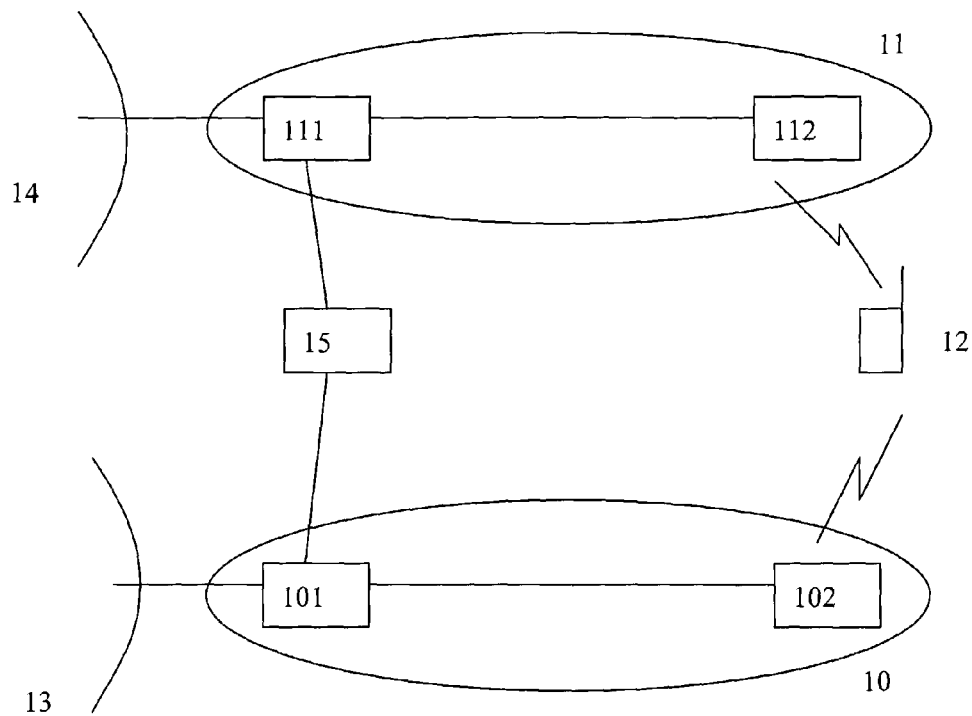
FIG. 1 shows a schematic block diagram of a system in which the present invention can be embodied.

FIG. 1 shows a schematic representation of an embodiment of the invention. Reference numeral 10 refers to an Internet protocol Multimedia System (IMS) subsystem, and reference numeral 11 describes a circuit switched subsystem. A mobile terminal 12 is suitable for communication with the circuit switched subsystem 11 and the IMS subsystem 10. Reference numerals 13 and 14 relate to further communication networks or subsystems with which the subsystems 10 and 11 can interact. Networks 13 and 14 could e.g. be a public switched telephone network (PSTN), a computer network such as the Internet, etc. The connections shown in FIG. 1 are only an example, and the subsystems 10 and 11 could both be connected to each of the networks 13 and 14, and it is also possible that there are more or less further networks than the shown networks 13 and 14. It is also noted that the present invention can be applied to systems comprising more than the two shown subsystems 10 and 11, and that the description of two subsystems is only done for the purpose of simplicity. All of the concepts described above and below can also be applied in the context of a subsystem selection entity operating in conjunction with more than two subsystems.

In FIG. 1 reference numeral 101 relates to a control node in the IMS subsystem, where the control node is suitable for controlling the provision of a service to the mobile terminal 12. Reference numeral 102 describes an access node via which the mobile terminal 12 accesses the IMS subsystem 10. Reference numeral 111 similarly relates to a control node of the circuit switched subsystem 11, suitable for controlling and managing service provision of the circuit switched subsystem 11 to the mobile terminal 12. Reference numeral 112 describes an access node via which the mobile terminal 12 can access the circuit switched subsystem 11.

It is noted that the representation in FIG. 1 is only schematic, and that the subsystems will generally comprise a larger number of nodes, e.g. intermediate nodes and gateway nodes, which are not shown here for simplicity. Furthermore, it is possible that specific access networks are arranged between the mobile terminal 12 and the subsystems 10 and 11. The figure shows one mobile station for the purpose of simplicity and clarity, but it should be understood that an actual communication system will be arranged to provide service to a much larger number of mobile stations.

It is noted that the mobile station 12 is an example of a terminal that is capable of communication with two different subsystems. Nonetheless, the invention is not restricted to mobile terminals, and can be applied to any terminals that are capable of communication with two or more subsystems.

In the example of FIG. 1, a subsystem selection entity 15 is provided. It is noted that the term "entity" relates to any unit or system of units that is capable of providing a certain functionality, such that the subsystem selection entity 15 may be comprised in a node of one of the networks or subsystems shown in FIG. 1, or can be provided in a unit (server) outside of these networks, or can be spread out over several nodes and/or several separate units.

In accordance with an embodiment of the invention, the subsystem selection entity 15 is arranged for conducting a subsystem selection procedure that comprises making at least one subsystem selection decision associated with a subscriber terminating service. A subscriber terminating service is a service to be terminated at the terminal of a subscriber, such as a call (e.g. voice call, multimedia call, etc.) directed towards a terminal, or a message to be delivered to the terminal. The subsystem selection decision serves to select a first subsystem (e.g. IMS subsystem 10) or a second subsystem (e.g. circuit switched subsystem 11) for terminating the subscriber terminating service at the terminal 12. Furthermore, the subsystem selection entity 15 is arranged to perform a control procedure comprising at least one control operation for controlling how the first or second subsystem conduct a subscriber-not-reachable service.

Figure 3:
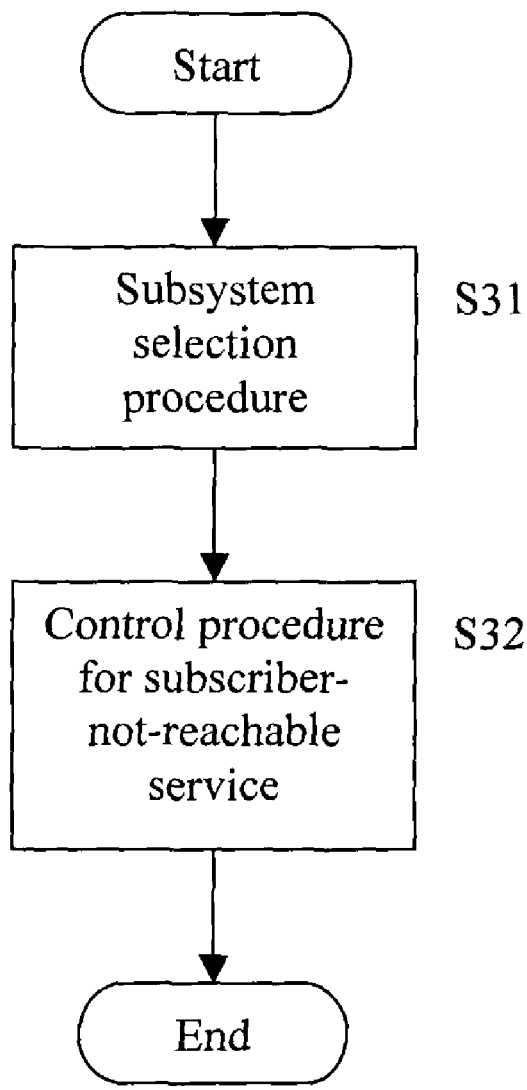
FIG. 3 shows a flow chart of a basic method embodiment of the present invention.

The corresponding control method is shown in FIG. 3, where S31 represents the subsystem selection procedure and S32 represents the control procedure for controlling how one or both of subsystems 10 and 11 conduct a subscriber-not-reachable service.

It is noted that in the example of FIG. 1, the two subsystems 10 and 11 provide overlapping subscriber terminating services, which in other words means that the two subsystems 10 and 11 offer at least some of the same services to the terminal 12. In this case, it is meaningful for the subsystem selection entity 15 to make a subsystem selection entity for a particular subscriber terminating service, namely if the subscriber terminating service in question can be handled by both subsystems.

Figure 2:
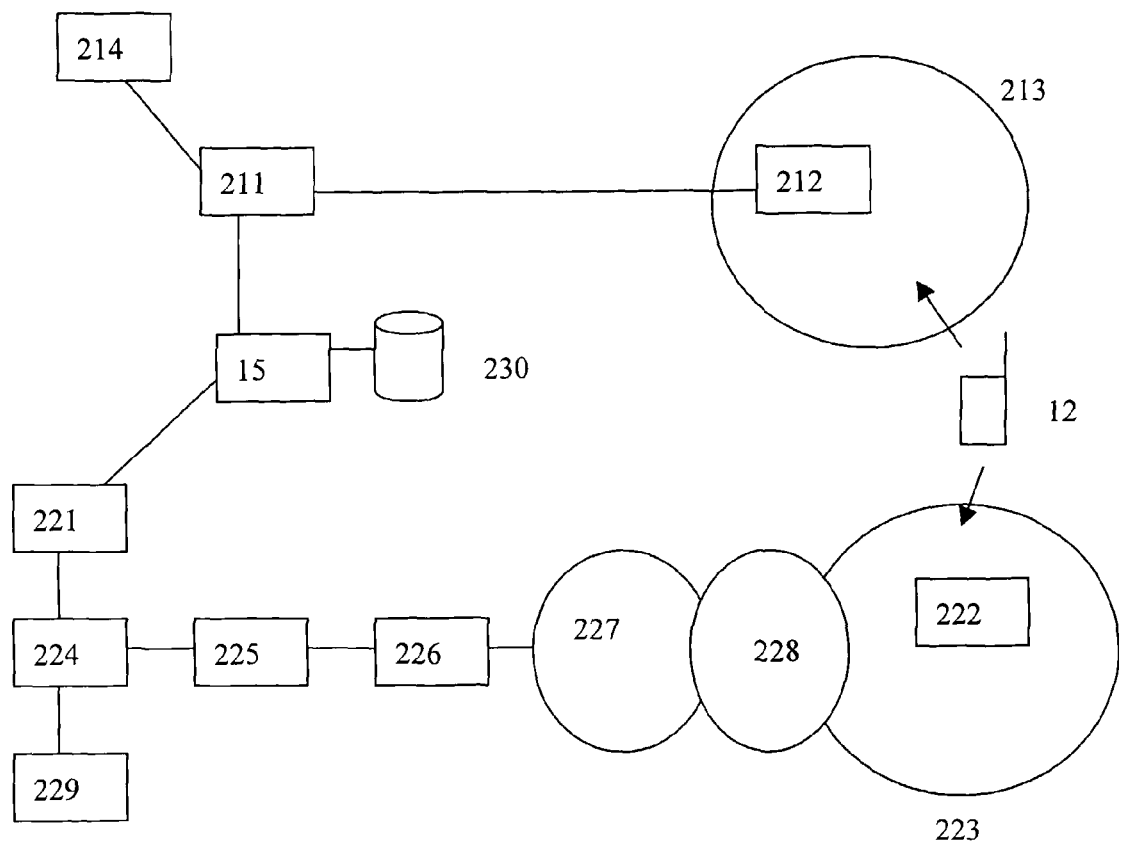
FIG. 2 shows a more detailed block diagram of elements in a circuit switched subsystem and an IMS subsystem in which the present invention can be applied.

FIG. 2 shows the circuit switched subsystem and the IMS subsystem in more detail. Reference numeral 211 describes a mobile switching center (MSC), reference numeral 214 describes a home location register/visitor location register (HLR/VLRL) and reference numeral 212 describes a radio network controller (RNC). Elements 211, 212 and 214 are all part of a circuit switched subsystem. Reference numeral 213 symbolizes a coverage area of the circuit switched subsystem, e.g. a GSM or WCDMA coverage area.

Reference numeral 221 describes a telephony application server (TAS), reference numeral 224 a serving call/session control function (S-CSCF), reference numeral 225 relates to an interrogating call/session control function (I-CSCF), and reference numeral 226 relates to a proxy call/session control function (P-CSCF). Reference numeral 229 describes a home subscriber server (HSS). These elements are part of an IMS subsystem. Furthermore, the P-CSCF 226 is connected to a packet switched access network 227, which in turn is connected to a wireless local area network (WLAN) 228. Reference numeral 223 symbolizes the WLAN coverage area, and reference numeral 222 refers to a WLAN serving node (WSN).

The above described elements in FIG. 2 are well known in the art, such that further details are not necessary. Furthermore, they are shown in FIG. 2 as separate elements for the purpose of explanation, but in a communication network they may also be provided together in specific nodes. For example, the home subscriber server 229 may comprise a home subscriber register (HSR) for the IMS subsystem, and the HLR/VLR 214 of the circuit switched subsystem.

The subsystem selection entity 15 is preferably equipped with a data base for keeping a state record of each subscriber terminating service being handled. Such a data base is indicated by reference numeral 230 in FIG. 2. Preferably, the subsystem selection entity is arranged such the subsystem selection procedure and/or control procedure for subscriber-not-reachable services can query the database for information to be used as a basis for making decisions.

The subsystem selection decision can be based on any decision information that is suitable or desirable. For example, the decision information may comprise one or more of the following: a reachability information associated with a reachability of the terminal 12 via one or both of the subsystems, a preference information associated with a preference set by a user of the terminal 12, a preference information associated with a preference set by an operator of the first subsystem 10 and/or an operator of the second subsystem 11, a subscription information associated with a subscription of the user of terminal 12, a time information associated with a time of day, a load information associated with a load of one or both of the first and second subsystems 10, 11, a coverage information associated with a coverage of one or both of the first and a second subsystems 10 and 11, an availability information associated with an availability of one or both of the first and second subsystems 10, 11, a service type information associated with a service type of the subscriber terminating service for which the subsystem selection entity 15 is to make a decision, a connection information associated with one or more active connections involving one or more of the first subsystem, second subsystem and terminal 12, a terminal capability information associated with a capability of the mobile terminal (e.g. capability to handle video streams), and node capability information relating to node capabilities of the first and/or second subsystem.

Equally, the control procedure comprising a control operation for controlling how the first or second subsystem conduct a subscriber-not-reachable service can also be based on any suitable or desirable control decision information, e.g. on one or more of the just described examples of the decision information used by the selection procedure.

The specific steps of the control procedure for controlling how the subsystems conduct a subscriber-not-reachable service can also be chosen as is suitable or desirable for a specific object.

Figure 4:
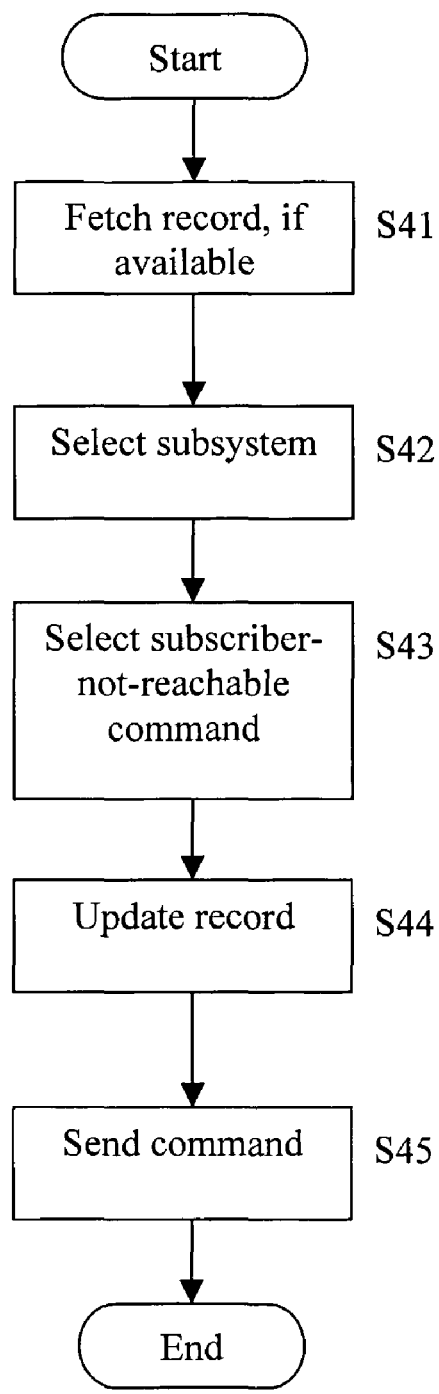
FIG. 4 shows a flow chart of a further method embodiment of the present invention.

FIG. 4 shows a flow chart of a method embodiment of the present invention. The procedure starts based on a predetermined triggering event, e.g. the receipt of a request for a subscriber terminating service such as a call request for the first subsystem 10 or the second subsystem 11 (see FIG. 1). In step S41, the procedure first fetches a record for the desired subscriber terminating service, if available. For example, if the subscriber terminating service is a call to be terminated at terminal 12, then a data base 230 (see FIG. 2) is queried, in order to determine whether a record for the call in question is present or not, e.g. based on the call ID. Alternatively or additionally, the record can also be associated with an ID of the terminal and/or of the subscriber, such as the IMSI (International Mobile Subscriber Identity). Naturally, the records for subscriber terminating services can be kept in any suitable or desirable way that allows the identification of individual services for which a subsystem is to be selected.

Then, in step S42 a subsystem is selected, e.g. based on predetermined decision information as described above. In step S43 a subscriber-not-reachable command is selected, e.g. based on information as described above. Then, in step S44, the record for the subscriber terminating service in question is updated in the data base 230 (see FIG. 2), and then in step S45 the command selected in S43 is sent e.g. to the subsystem selected in step S42. However, it is noted that the selection of a subscriber-not-reachable command in step S43 can also relate to both subsystems 10 and 11, and consequently the sending of the command S45 can also relate to both subsystems 10 and 11.

It is noted that the entity and method of the present invention does not require the keeping of a state record as implied by steps S41 and S44 in the example of FIG. 4, however, such a keeping of a state record is preferred. In other words, it is preferred that a subsystem selection entity of the invention comprises a data base for keeping a state record of the subsystem selection decision and the control operation associated with the subscriber terminating service, where the subsystem selection procedure and the control procedure are arranged to query the state record. In this way, if the request for terminating the subscriber service in question is returned to the subsystem selection entity for any reason (e.g. because the selected subsystem is not capable of terminating the service or performing a subscriber-not-reachable service, or at least not capable of performing a subscriber-not-reachable service in accordance with a previous instruction from the subsystem selection entity), then the subsystem selection procedure (step S42) and/or the control procedure for controlling the subscriber-not-reachable service (step S43) can be conducted in accordance with reference to previous decisions made with respect to the subscriber service in question, and subsequently written into the state record (see step S44).

The command selected in step S43 can e.g. be a command for conducting a specific subscriber-not-reachable service. As an example, the subsystem selection entity 15, after having selected subsystem 11 for terminating a call, may instruct subsystem 11 to apply a call-forwarding to a mailbox as a subscriber-not-reachable service in the event that the call cannot be terminated by subsystem 11. The basis for this command can be user preference information, e.g. the subscriber of terminal 12 may have recorded preference information according to which the call-forwarding to a mailbox is the desired subscriber-not-reachable service.

On the other hand, the subscriber-not-reachable command may also be an instruction for not conducting a specific subscriber-not-reachable service. As an example, the user may have recorded preference information that he does not wish that calls that cannot be terminated be forwarded to a mailbox. The decision can also be based on preference information recorded by the network operation, or on subscription information (e.g. the user of terminal 12 has a subscription that does not provide for call-forwarding to a mailbox).

It is noted that the command for not conducting a specific subscriber-not-reachable service can be combined with a command for conducting a different specific subscriber-not-reachable service. Namely, it is possible that one or more specific subscriber-not-reachable services are considered desirable by said user preference information, and one or more other subscriber-not-reachable services are set not to be used, based on preference information set by the user.

It is furthermore noted that the command for not conducting a specific subscriber-not-reachable service can be limited insofar as the instructed subsystem only preliminarily does not conduct the indicated subscriber-not-reachable service, e.g. does not conduct the subscriber-not-reachable service in a first attempt, but can then use it in further attempts if other subscriber-not-reachable services fail to provide a result.

According to a further embodiment of the invention, the control operation may comprise sending a command for at least preliminarily not conducting any subscriber-not-reachable services. The purpose of such a command can be to make a best attempt to terminate the desired service at the terminal, and to avoid the invoking of a subscriber-not-reachable service, if possible. The basis for such a decision can again be user preference information, e.g. the user has indicated that calls should preferably be terminated and not e.g. forwarded to a mailbox. As a consequence, the subsystem selection entity could in this example first select a subsystem (see S42) and then select the command to not conduct any subscriber-not-reachable services in step S43. These decisions are then written into the state record in step S44 and in step S45 the command is sent to the selected subsystem together with the data relating to the subscriber service to be terminated, e.g. a voice call. If one assumes that subsystem 11 was selected, and subsystem 11 fails to terminate the call, then due to the command to not conduct a subscriber-not-reachable service, the call request can be returned to the subsystem selection entity. In again performing the steps of FIG. 4, and making use of the state record, the subsystem selection entity can then attempt to terminate the call via the other subsystem 10. If the terminal 12 is then reachable via subsystem 10, the call will be terminated, in accordance with the user's preference.

In the above example, it was assumed that the selected subsystem would return the request for the subscriber terminating service if termination was not possible and subscriber-not-reachable services were not desired. This can be a default adjustment in a subsystem, i.e. the subsystem operates automatically in this way. However, it is also possible that the control operation of the subsystem selection entity comprises sending an explicit command to the subsystem selected in the subsystem selection decision, for instructing the selected subsystem to notify the subsystem selection entity if the terminals are not reachable by the selected subsystem.

Figure 5:
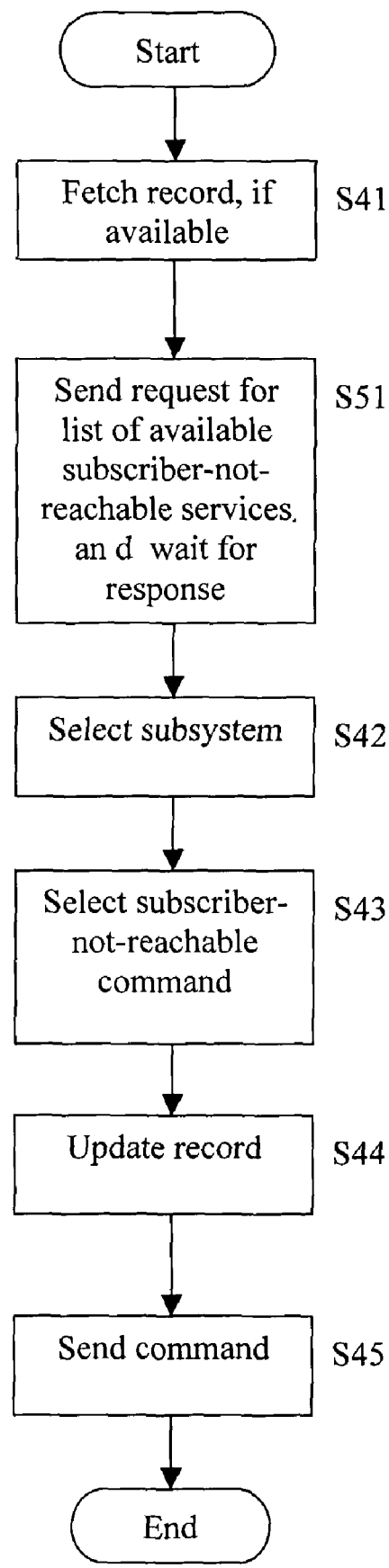
FIG. 5 shows a flow chart of a further method embodiment of the invention.

According to a further embodiment of the invention, the control operation may comprise sending a request for a list of available subscriber-not-reachable services to one or both of the subsystems. This is shown in the example of FIG. 5, which comprises the same steps as FIG. 4, such that a repeated description of these steps is not necessary, and additionally comprises a step S51, in which a request for a list of available subscriber-not-reachable services is sent after step S41. Step S51 furthermore comprises waiting for a response. Then, it is preferred that the subsystem selection decision in step S42 and the selection decision for the subscriber-not-reachable command in step S42 is also based on the list or lists of subscriber-not-reachable services available in subsystem 10 and/or subsystem 11. For example, based on a user preference setting to which a mailbox service is the preferred subscriber-not-reachable service, and based on a list from subsystem 10 and a list from subsystem 11 according to which only subsystem 11 offers a mailbox service, the subsystem selection entity can select subsystem 11 in step S42 and select the command to apply the mailbox service in step S43.

In the previous examples, the control procedure for controlling how one or more subsystems conduct a subscriber-not-reachable service comprised selecting and sending an appropriate command. As an alternative or in addition thereto, it is also possible for the control operation to comprise the selecting of a policy for controlling subscriber-not-reachable services from among a plurality of policies. The number of different policies to choose from, and the content of each individual policy can be chosen in any suitable or desirable way. Examples of different policies will be given further on. If the choosing of a policy replaces the choosing of a subscriber-not-reachable command, then appropriate procedures can e.g. look like the methods described in FIGS. 4 and 5, except that in step S43 a policy is selected, and in step S45 the selected policy is communicated to one or more subsystems. In an embodiment using a policy, it is preferable that the subsystems are aware of the different possible policies such that it is sufficient for the subsystem selection entity to only identify the particular policy selected. However, it is also possible that the step of communicating the selected policy comprises conveying details of the selected policy, such that a processing can also be performed by subsystems that are themselves not aware of each of the policies' details.

One of said plurality of policies may comprise that the subsystem selected in the subsystem selection decision automatically applies its subscriber-not-reachable services if the terminal is not reachable, and notifies the subsystem selection entity if the terminal is reachable and no subscriber-not-reachable services are applicable. It is noted that the policy also covers a situation in which a selected subsystem has no subscriber-not-reachable services or only has a single one. This policy means that a subsystem acts in such a way that if it receives a request for a subscriber terminating service (e.g. for a call), it attempts to terminate the service. If termination is not possible (e.g. because the terminal is not in the area of coverage or has not registered), then the subsystem attempts to apply subscriber-not-reachable services. If none are available, then the subsystem selection entity is notified that the terminal is not reachable and that no subscriber-not-reachable services are applicable. If one or more subscriber-not-reachable services are available, then the subsystem attempts to apply them according to a predetermined procedure for applying one or more subscriber-not-reachable services. This can be done in any known way, e.g. if call-forwarding to a mailbox is available and set as the primary subscriber-not-reachable service, then the subsystem attempts such a call-forwarding. If an attempted subscriber-not-reachable service is successful, then the processing of the subscriber terminating service ends there. If no subscriber-not-reachable services are successful, then the subsystem selection entity is appropriately notified, as already described.

Said plurality of policies may also comprise a policy according to which the subsystem selected in the subsystem selection decision does not automatically apply its subscriber-not-reachable services if the terminal is not reachable, and notifies the subsystem selection entity if the terminal is not reachable and includes a list of applicable subscriber-not-reachable services. The subsystem selection entity is then preferably arranged in such a way that it can repeat the subsystem selection decision and/or the control operation for controlling how the subsystem conducts a subscriber-not-reachable service on the basis of the list of applicable subscriber-not-reachable services. It is noted that the list of applicable subscriber-not-reachable services can be identical to the number of subscriber-not-reachable services available at the subsystem in question, or can be a subset thereof, e.g. if the subsystem determines that for the terminal in question only a smaller number of the available subscriber-not-reachable services is in fact applicable.

The plurality of policies may furthermore comprise a policy according to which the subsystem selected in the subsystem selection decision does not automatically apply its subscriber-not-reachable services if the terminal is not reachable, and notifies the subsystem selection entity if the terminal is not reachable.

Another possible policy among the plurality of policies may comprise that the subsystem selected in the subsystem selection decision automatically applies its subscriber-not-reachable services if the terminal is not reachable, and does not notify the subsystem selection entity if the terminal is not reachable. The concept of this policy therefore is that although a policy is selected as part of a control procedure for controlling how one or more of the subsystems conduct a subscriber-not-reachable service, the outcome of the operation is a policy according to which the subsystem or subsystems are not instructed with respect to handling subscriber-not-reachable services. As a consequence, if this policy is chosen, it is preferred to then also delete any records having to do with the particular subscriber terminating service (or associated with the terminal and/or subscriber) for which the subsystem selection entity is making a decision. For example, if the subscriber terminating service is a voice call, and the state record is kept with respect to the call ID, then the state record for that particular call ID is purged, such that the subsystem selection entity "loses its memory" with respect to that call. As a consequence, if at a later time (due to whatever reason) a call request for the same call is received, then the subsystem selection entity treats the call as if received for the first time.

The above examples of policies can e.g. be combined as described in the following example.

The subsystem selection entity can be arranged to make a subsystem selection decision and a policy selection decision, preferably in dependence on the type of subscriber terminating service being handled and on state information maintained in data base 230, if available for the specific service (e.g. the specific call) being handled. The subsystem selection entity can be arranged to make a policy selection from the following four available policies:

Policy 1, which can be summarized as "apply target subsystem subscriber-not-reachable services and possibly come back":
  If the subscriber cannot be reached, all subscriber-not-reachable services available are executed in the selected subsystem as if it were the only subsystem;
  If the list of subscriber-not-reachable services has been completed without success or if no subscriber-not-available services are applicable, pass responsibility back to subsystem selection entity for further decisions;
  Subsystem selection entity makes decision to route the subscriber terminating service to another subsystem (hunting).

Policy 2, which can be summarized as "come back with list of target subsystem services":
  If the subscriber cannot be reached in the selected subsystem, pass responsibility back to the subsystem selection entity and provide a list of applicable subscriber-not-reachable services;
  The subsystem selection entity routes the subscriber terminating service again (possibly to the same subsystem again, or to another subsystem), and includes the applicable subscriber-not-reachable services provided previously in the list. If the subscriber is not reachable in the presently selected subsystem, then a predetermined procedure can be conducted, e.g. to let the present subsystem apply its subscriber-not-reachable services if they are the same as those indicated in the list, to pass the service back to the previous subsystem for subscriber-not-reachable handling if the previous subsystem has one or more preferable subscriber-not-reachable services, or attempting subscriber-not-reachable services in an order of preference, where the previous or present subsystem is selected depending on the availability of the desired subscriber-not-reachable service.

Policy 3, which can be summarized as "ignore target subsystem subscriber-not-reachable services and give responsibility back to subsystem selection entity":
  If the subscriber cannot be reached in the selected subsystem, pass responsibility back to the subsystem selection entity;
  The subsystem selection entity then routes the subscriber terminating service being handled to a different subsystem (hunting);

Policy 4, which can be summarized as "do not come back":
  If the subscriber cannot be reached in the selected subsystem, then simply complete the subscriber terminating service.

Policy 4 is preferably chosen if the subsystem selection entity is at the end of hunting, i.e. has attempted to route the subscriber terminating service through all available subsystems and has reached the last subsystem. The "completing" of the call means that the selected subsystem will first attempt to terminate the service, and if this is not successful, to apply available subscriber-not-reachable services. If this is also unsuccessful, then an appropriate notification is given to the originator of the subscriber terminating service (e.g. the calling terminal), as is well known in the art, e.g. through indication of a busy signal or a message that the desired subscriber is not reachable.

Figure 6:
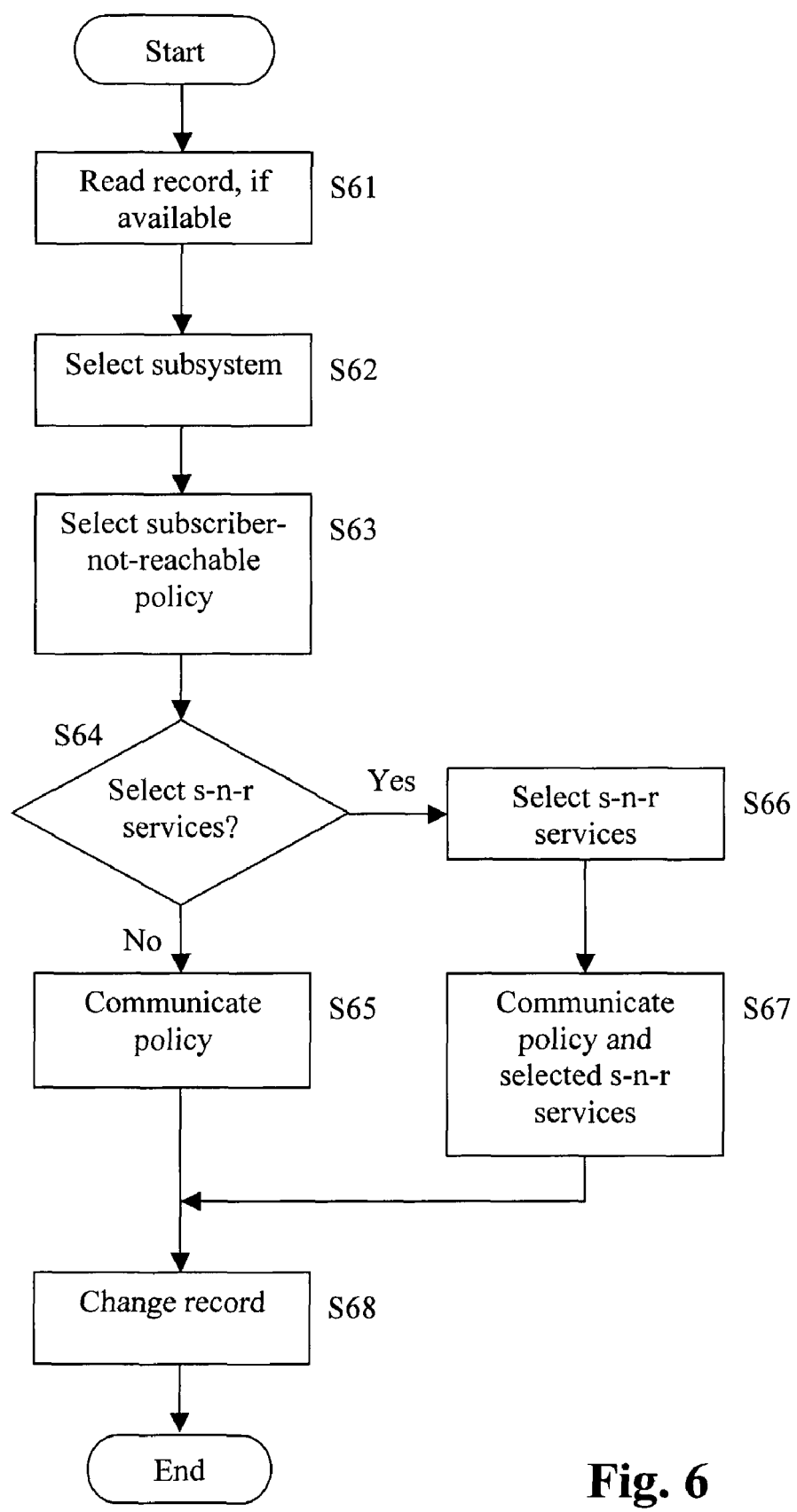
FIG. 6 shows a flow chart of a further method embodiment of the invention.

An example of a procedure that makes a policy selection is shown in FIG. 6. Initially, e.g. after having received a request for a subscriber terminating service (e.g. a call request for terminating a call at the terminal), the subsystem selection entity first reads a record for the specific service, if available, see step S61. Then, a subsystem selection is performed in S62. The subsystem selection decision can be performed on the basis of any one or more of the previously mentioned information examples, and especially can be based upon information from the record read in step S61. As an example, the record can contain information on subscriber-not-reachable services applicable by one or more of the subsystems open for selection. This information can e.g. have been provided in previous invocations of the subsystem selection entity and subsequent selections of above-mentioned policy 2.

The procedure then continues with step S63, in which a subscriber-not-reachable policy (e.g. one of policies 1 to 4) is selected. In step S64 it is determined whether a subscriber-not-reachable service needs to be selected, which is e.g. possible if policy 2 has been selected previously in step S63. If one or more subscriber-not-reachable services need to be selected, then the procedure branches to step S66, in which the one or more subscriber-not-reachable services are appropriately selected and then communicated to the subsystem selected in step S62, together with the policy selected in step S63, see step S67. On the other hand, if in step S64 it is determined that no subscriber-not-reachable services need to be selected, then the procedure branches to step S65, in which simply the policy selected in step jS63 is communicated to the subsystem selected in step S62. It is noted that the communication of information can be done in any suitable or desirable way, e.g. via dedicated signalling messages or as a part of messages in which e.g. the request for the subscriber terminating service is being forwarded. If the subsystems are aware of the available policies, then no contents of a selected policy need to be communicated, and therefore it can be sufficient to simply send a policy identifier for identifying the selected policy, e.g. a flag in a message in which the request for the subscriber terminating service is being sent.

Finally, subsequent to steps S65 or S67, the record for the subscriber terminating service being handled is appropriately updated. The updating can also consist in a deleting of the record, e.g. if policy 4 was chosen in step S63. Otherwise, the selections made in one or more of steps S62, S63 and S66 are recorded, possibly together with further information received as a part of the policy, e.g. the above-mentioned lists of subscriber-not-reachable services available in one or more of the subsystems.

As already mentioned the records themselves can be kept in any suitable or desirable way, e.g. based on a service ID (such as a call ID), such that each subscriber terminating service being processed can be identified.

Besides the deleting conducted subsequent to selecting policy 4, the state records held in database 230 should preferably be purged from time to time in order to avoid memory overflow. This can be done in any suitable or desirable way, e.g. by marking each record with an initial time of recording, and subsequently regularly deleting such records for which the difference between the present time and the initial recording time exceeds a predetermined threshold. Alternatively, a timer can be set for each record upon initial recording, and the record being deleted when the timer expires. The setting of the above-mentioned threshold or timer value can be done based on experience for how long a typical service to be terminated at a subscriber is "alive" during the set-up phase. In other words, if the average time for setting up a terminating service is ΔT, when the above-mentioned threshold or timer value can be set to a predetermined multiple of ΔT.

Now examples of a signalling and message exchange between some of the entities described in FIG. 2 will be described with reference to FIGS. 7 and 8.

Figure 7:
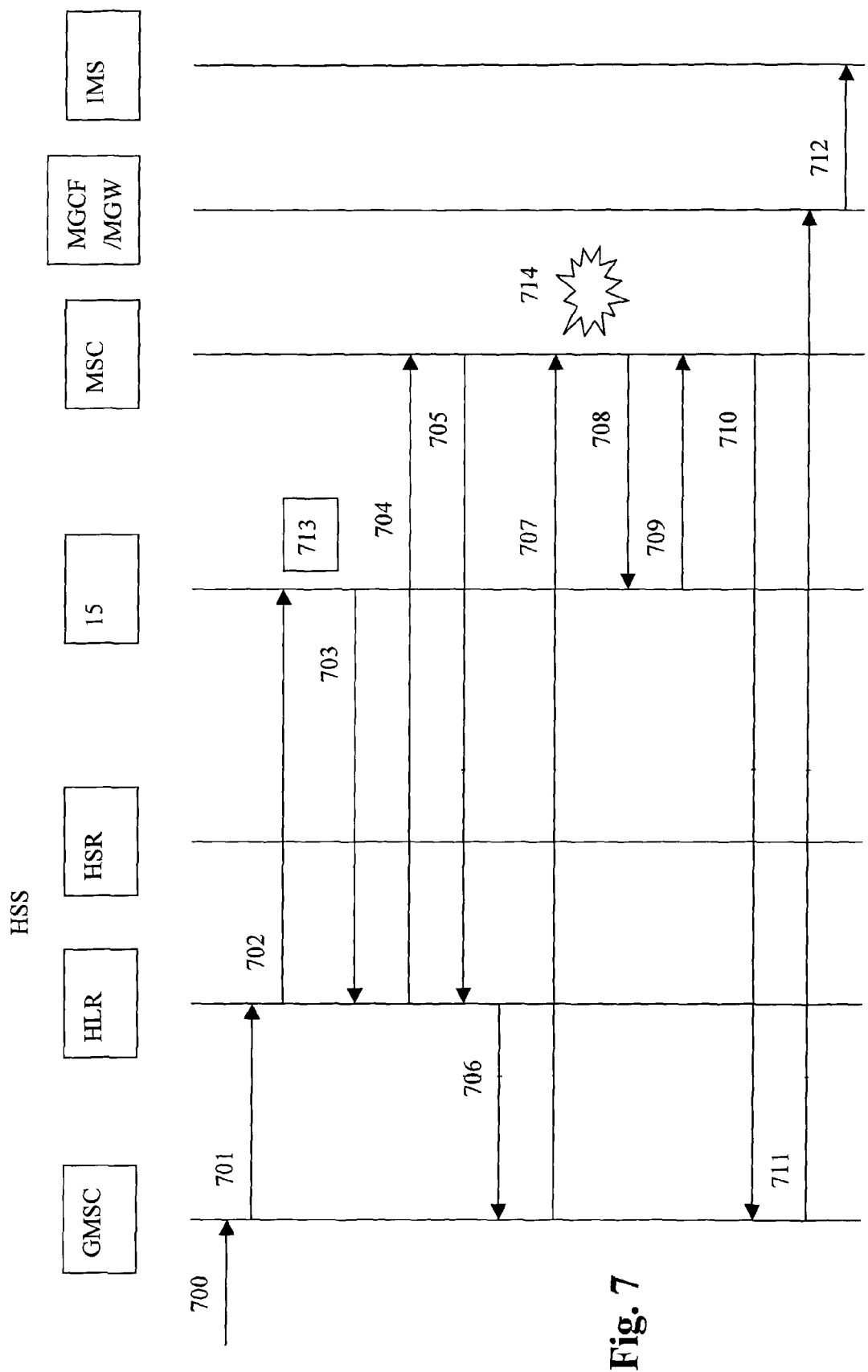
FIG. 7 shows a signalling exchange between various system components in an embodiment of the present invention.

In FIG. 7, an example is shown, in which the subsystem selection entity 15 decides to first terminate a call in the circuit switched subsystem, but because the subscriber is not reachable there, a second interrogation of the subsystem selection entity 15 takes place, whereupon the IMS subsystem is selected. More specifically, the GMSC first receives a message 700 as a part of a call request, e.g. an ISUP (ISDN user part) IAM (initial address message). The GMSC then sends an appropriate request for information to the HSS, more specifically to the HLR in the HSS, see message 701, which can e.g. be a MAP (mobility application protocol) SRI (send routing indication). The HLR then sends a query 702 to the subsystem section entity 15. The query 702 requests a decision on selecting the circuit switched subsystem or the AMS subsystem. The message 702 can e.g. contain the call ID, and/or the IMSI (international mobile subscriber identity) of the subscriber for which a service is to be terminated at the terminal of said subscriber, as an information for identifying an associated record in the database 230.

Reference numeral 713 in FIG. 7 symbolizes the procedure of selecting a subsystem and writing a record in accordance with e.g. one of the embodiments of FIG. 4, 5 or 6.

Message 703 is the response of the subsystem selection entity 15 to the HLR, in which in the present example the circuit switched subsystem is identified as having been selected. Consequently, the HLR sends message 704 to the MSC, e.g. a MAP PRN (provide roaming number) message. The MSC acknowledges this with message 705. Subsequently, the HLR acknowledges message 701 with message 706. Then, the original message 700 is passed on to the MSC in message 707 e.g. as a BICC (bearer independent call control) IAM.

Symbol 714 in FIG. 7 indicates that the MSC determines that the terminal (not shown in FIG. 7) is not reachable via the circuit switched subsystem. In the example of FIG. 7, it is assumed that the subsystem selection entity 15 has selected a policy in 713 according to which the selected subsystem should notify the subsystem selection entity if the subscriber is not reachable. As an example, 713 may have comprised selecting policy 2 or policy 3. The policy indication could e.g. have been sent as a flag in messages 703, 704 and/or 703, 706 and 707. If policy 2 was chosen, then message 708 may also comprise the list of subscriber-not-reachable services available in the circuit switched subsystem. The subsystem selection entity 15 then repeats the procedure of selecting a subsystem and performing a control operation related to the subscriber-not-reachable services, and sends a message 709 to the MSC, in which in the example of FIG. 7 it is indicated that the call is to be routed through the IMS subsystem. As a consequence, the MSC performs an ITU pivot routing via the GMSC (message 710), which then conducts a forwarding procedure to the MGCF/MGW (see message 711, e.g. a BICC IAM). The MGCF/MGW then hands the call to the IMS with message 712. The further processing is assumed to be conventional and therefore not shown further.

Figure 8:
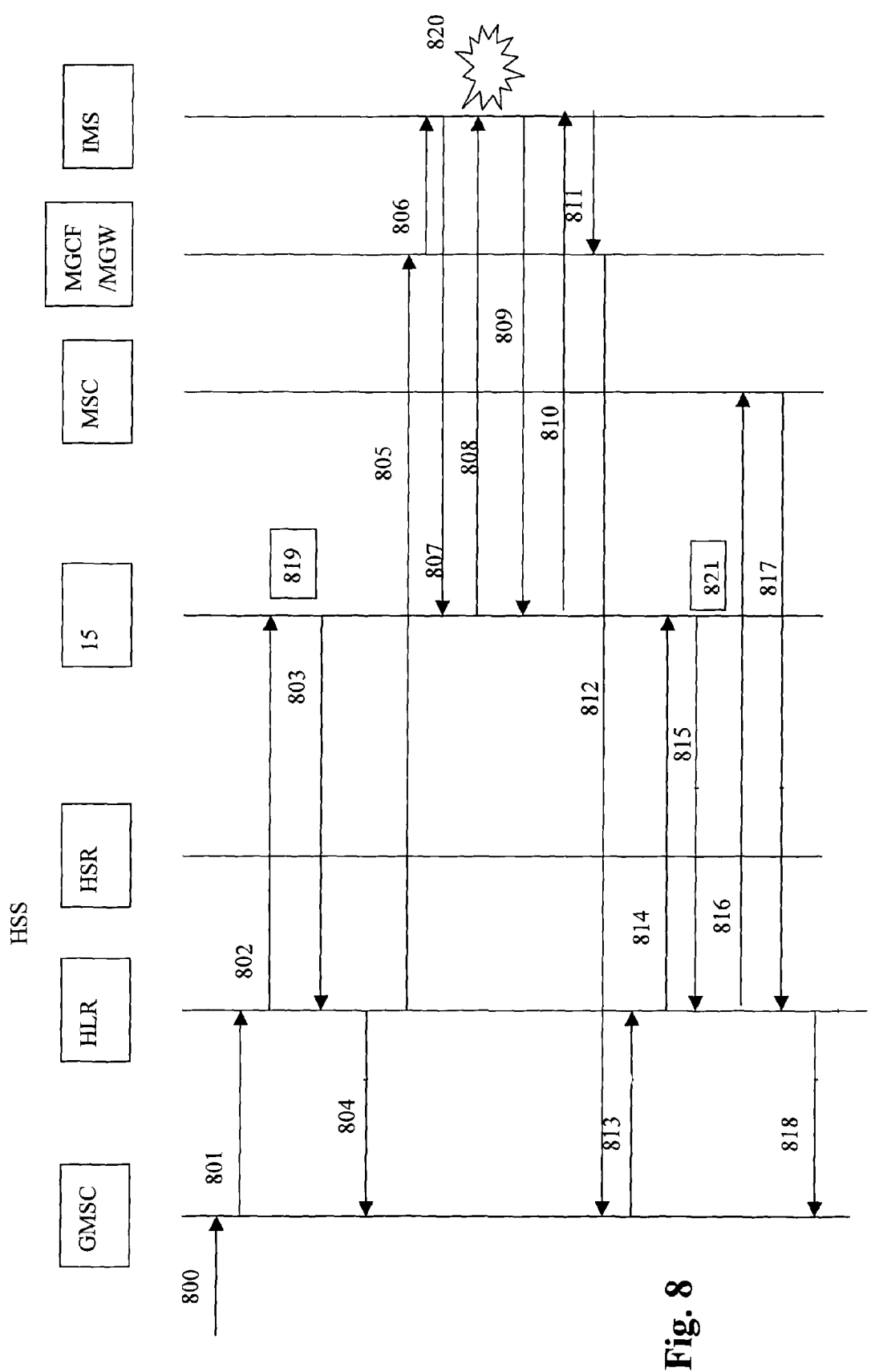
FIG. 8 shows a signalling exchange between various components of a system according to another embodiment of the present invention.
Figure 9:
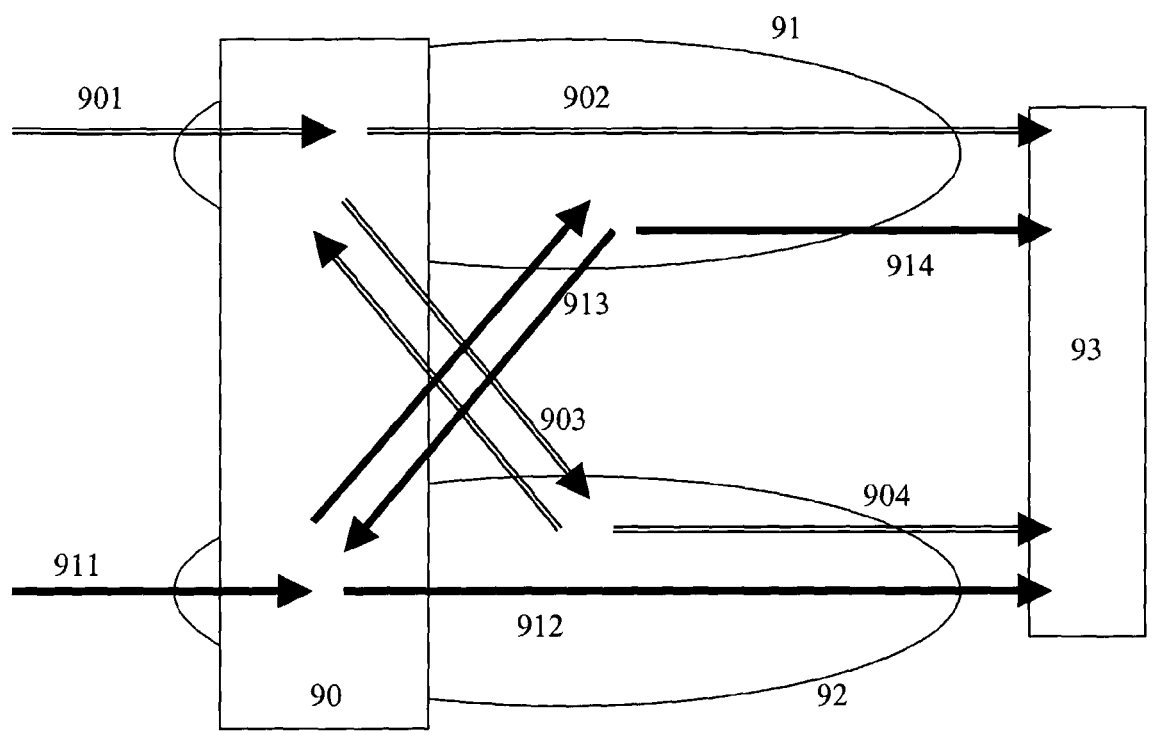
FIG. 9 schematically shows the functionality of a known network domain selection entity.

In FIG. 8 an example is shown in which the subsystem selection entity 15 first decides to terminate a call in the IMS. In the example, messages 800, 801 and 802 correspond to previously described messages 700, 701 and 702, respectively, such that a further description is not necessary. 819 symbolizes a decision procedure on the part of the subsystem selection entity 15, in which a subsystem and a policy is selected. In the example of FIG. 8, message 803 indicates the decision to route the call to the IMS. Message 804 is an acknowledgement of message 801, and based on the decision communicated in message 803, the HLR routes the call to the MGCF/MGW in message 805 (e.g. a BICC IAM). The MGCF/MGW then appropriately notifies the IMS in message 806, e.g. with a SIP (session initiation protocol) INVITE. The IMS could then interrogate the subsystem selection entity 15 with message 807, where entity 15 responds with message 808 after having consulted the state record initially laid down in 819, that the IMS is indeed selected. Symbol 820 in FIG. 8 indicates that the IMS determines that the subscriber is not reachable via the IMS. It is furthermore assumed that a policy has been previously selected and communicated to the IMS, according to which the selected subsystem notifies the subsystem selection entity in the event that the subscriber is not reachable, see message 809. Based upon message 809, the subsystem selection entity 15 repeats at least a subsystem selection, and in the example it is assumed that message 810 indicates that the call is now to be routed to the circuit switched subsystem. As a consequence, the IMS passes the call to the circuit switched subsystem via e.g. ITU pivot routing, see messages 811, 812. The GMSC then notifies the HLR message 813, which in turn queries the subsystem selection entity 15 in message 814. The entity 15 then performs a renewed selection procedure, where by use of the state record that indicates the previous try via the IMS, the decision to route the call via the circuit switched subsystem is confirmed, and a "do not come back" policy (such as above-described policy 4) is chosen, as the example of FIG. 8 only assumes the existence of two subsystems, such that the circuit switched subsystem is the last untried subsystem for terminating the call. The procedure in 821 then preferably also comprises releasing or deleting the record for the call being handled. The decisions are communicated to the HLR in message 815, which then proceeds to route the call in known fashion via messages 816, 817 and 818. The further processing is assumed to be conventional and therefore not shown for simplicity. It is to be noted that due to the selection of policy 4 in 821, there is no need for a further interrogation of the subsystem selection entity 15.

Although the present invention has been described on the basis of detailed examples, it is to be noted that these only serve to provide a more thorough understanding and are not intended to be limiting. The scope of protection is defined by the appended claims. Reference signs in the claims have no limiting effect, as they only serve to make the claims easier to read.

The invention claimed is:

1. A subsystem selection entity for a communication system that comprises:
   a first subsystem,
   a second subsystem and
   at least one terminal suitable for communication with said first and second subsystem, said subsystem selection entity being arranged for conducting a subsystem selection procedure that comprises
       making at least one subsystem selection decision associated with a subscriber terminating service involving said at least one terminal for selecting said first or said second subsystem for terminating said subscriber terminating service at said at least one terminal, said subsystem selection entity being arranged to perform a control procedure comprising at least one control operation for
       controlling how said first or second subsystem conduct a subscriber-not-reachable service, said subscriber-not-reachable service being conducted in the event that said subscriber terminating service cannot be terminated by the selected subsystem;
       sending a command for at least preliminarily not conducting a specific subscriber-not-reachable service to one or both of said subsystems; and
       sending a command to the subsystem selected in said subsystem selection decision, for instructing said selected subsystem to notify said subsystem selection entity if said terminal is not reachable by said selected subsystem.

2. The subsystem selection entity according to claim 1, wherein said control operation comprises sending a command for conducting a specific subscriber-not-reachable service to one or both of said subsystems.

3. The subsystem selection entity according to claim 1, wherein said control operation comprises sending a command for at least preliminarily not conducting any subscriber-riot-reachable services to one or both of said subsystems.

4. The subsystem selection entity according to claim 1, wherein said control operation comprises sending a request for a list of available subscriber-not-reachable services to one or both of said subsystems.

5. The subsystem selection entity according to claim 1, wherein said control operation comprises selecting a policy for controlling subscriber-not-reachable services from among a plurality of policies.

6. The subsystem selection entity according to claim 5, wherein one of said plurality of policies comprises the subsystem selected in said subsystem selection decision automatically applying subscriber-not-reachable services if the terminal is not reachable, notifying said subsystem selection entity if said terminal is not reachable and no subscriber-not-reachable services are applicable.

7. The subsystem selection entity according to claim 5, wherein one of said plurality of policies comprises the subsystem selected in said subsystem selection decision not automatically applying subscriber-not-reachable services if the terminal is not reachable, notifying said subsystem selection entity if said terminal is not reachable and including a list of applicable subscriber-not-reachable services.

8. The subsystem selection entity according to claim 7, said subsystem selection entity being arranged to repeat one or both of said subsystem selection decision and said control operation, based on said list of applicable subscriber-not-reachable services.

9. The subsystem selection entity according to claim 5, wherein one of said plurality of policies comprises that the subsystem selected in said subsystem selection decision does not automatically apply its subscriber-not-reachable services if the terminal is not reachable, and notifies said subsystem selection entity if said terminal is not reachable.

10. The subsystem selection entity according to claim 5 one of said plurality of policies comprising the subsystem selected in said subsystem selection decision automatically applying subscriber-not-reachable services if the terminal is not reachable, and not notifying said subsystem selection entity if said terminal is not reachable.

11. The subsystem selection entity according to claim 5, wherein said control operation comprises sending a policy identifier for identifying the selected policy to one or both of said subsystems.

12. The subsystem selection entity according to claim 1, wherein said subsystem selection decision is dependent on subscriber-not-reachable services applicable by one or both of said subsystems.

13. The subsystem selection entity according to claim 1, further comprising a database for keeping a state record of said subsystem selection decision and said control operation associated with said subscriber terminating service, where said subsystem selection procedure and said control procedure are arranged for querying said state record.

14. The subsystem selection entity according to claim 1, wherein said first subsystem is a circuit switched subsystem and said second subsystem is an Internet Protocol Multimedia System subsystem.

15. A method of controlling a subsystem selection entity for a communication system that comprises a first subsystem, a second subsystem and at least one terminal suitable for communication with said first and second subsystem, said method comprising
conducting a subsystem selection procedure that comprises
making at least one subsystem selection decision associated with a subscriber terminating service involving said at least one terminal for
selecting said first or said second subsystem for terminating said subscriber terminating service at said at least one terminal; and
performing a control procedure comprising at least one control operation for
controlling how said first or second subsystem conduct a subscriber-not-reachable service, said subscriber-not-reachable service being conducted in the event that said subscriber terminating service cannot be terminated by the selected subsystem;
sending a command for at least preliminary not conduction a specific subscriber-not-reachable service to one or both of said subsystems; and
sending a command to the subsystem selected in said subsystem selection decision, for instructing said selected subsystem to notify said subsystem selection entity if said terminal is not reachable by said selected subsystem.

16. The method according to claim 15, wherein said control operation comprises sending a command for conducting a specific subscriber-not-reachable service to one or both of said subsystems.

17. The method according to claim 15, wherein said control operation comprises sending a command for at least preliminarily not conducting any subscriber-not-reachable services to one or both of said subsystems.

18. The method according to claim 15, wherein said control operation comprises sending a request for a list of available subscriber-not-reachable services to one or both of said subsystems.

19. The method according to claim 15, wherein said control operation comprises selecting a policy for controlling subscriber-not-reachable services from among a plurality of policies.

20. The method according to claim 19, one of said plurality of policies comprising the subsystem selected in said subsystem selection decision automatically applying its subscriber-not-reachable services if the terminal is not reachable, and notifying said subsystem selection entity if said terminal is not reachable and no subscriber-not-reachable services are applicable.

21. The method according to claim 19, one of said plurality of policies comprising the subsystem selected in said subsystem selection decision not automatically applying its subscriber-not-reachable services if the terminal is not reachable, and notifies said subsystem selection entity if said terminal is not reachable and including a list of applicable subscriber-not-reachable services.

22. The method according to claim 21, comprising repeating one or both of said subsystem selection decision and said control operation, based on said list of applicable subscriber-not-reachable services.

23. The method according to claim 19 one of said plurality of policies comprising the subsystem selected in said subsystem selection decision not automatically applying its subscriber-not-reachable services if the terminal 1s not reachable, and applying said subsystem selection entity if said terminal is not reachable.

24. The method according to claim 19 one of said plurality of policies comprising the subsystem selected in said subsystem selection decision automatically applying its subscriber-not-reachable services if the terminal is not reachable, and does not notify said subsystem selection entity if said terminal is not reachable.

25. The method according to claim 19, wherein said control operation comprises sending a policy identifier for identifying the selected policy to one or both of said subsystems.

26. The method according to claim 15, wherein said subsystem selection decision is dependent on subscriber-not-reachable services applicable by one or both of said subsystems.

27. The method according to claim 15, comprising keeping a state record of said subsystem selection decision and said control operation associated with said subscriber terminating service in a database, where said subsystem selection procedure and said control procedure are arranged to query said state record.

28. The method according to claim 15, wherein said first subsystem is a circuit switched subsystem and said second subsystem is an Internet Protocol Multimedia System subsystem.

* * * * *

UNITED STATES PATENT AND TRADEMARK OFFICE
CERTIFICATE OF CORRECTION

PATENT NO.        : 8,229,408 B2                                                   Page 1 of 1
APPLICATION NO.   : 12/091000
DATED             : July 24, 2012
INVENTOR(S)       : Keller et al.

It is certified that error appears in the above-identified patent and that said Letters Patent is hereby corrected as shown below:

In the Drawings

In Fig. 5, Sheet 5 of 9, for Tag "S51", in Line 5, delete "an d" and insert -- and --, therefor.

In the Specifications

In Column 5, Line 17, delete "(HLR/VLRL)" and insert -- (HLR/VLR) --, therefor.

In Column 10, Line 48, delete "(hunting);" and insert -- (hunting). --, therefor.

In the Claims

In Column 15, Line 8, in Claim 14, delete "subsystem," and insert -- subsystem. --, therefor.

In Column 15, Lines 28-29, in Claim 15, delete "preliminary not conduction" and insert -- preliminarily not conducting --, therefor.

In Column 16, Line 22, in Claim 23, delete "1s" and insert -- is --, therefor.

Signed and Sealed this
Fifteenth Day of April, 2014

Michelle K. Lee
*Deputy Director of the United States Patent and Trademark Office*